UNITED STATES PATENT OFFICE.

WILLIAM KAHLERT, OF WASHINGTON, DISTRICT OF COLUMBIA.

COMPOSITION FOR SIZING WALLS.

SPECIFICATION forming part of Letters Patent No. 615,714, dated December 13, 1898.

Application filed September 10, 1897. Serial No. 651,260. (No specimens.)

*To all whom it may concern:*

Be it known that I, WILLIAM KAHLERT, a citizen of the United States, residing at Washington, in the District of Columbia, have invented certain new and useful Improvements in Composition for Sizing Walls; and I do declare the following to be a full, clear, and exact description of the invention, such as will enable others skilled in the art to which it appertains to make and use the same.

The object of my invention is to produce a composition to be employed on the walls or ceilings of houses or buildings of any kind preparatory to calcimining, white or color washing, or papering the walls or ceilings; also, to cover the stains on ceilings produced by leaks in roofs or produced by other causes on walls or other parts of a room.

My composition consists of the following ingredients, combined in about the following proportions, viz: alum, about nine pounds; soap, (Babbitt's preferred,) about three and one-half pounds; glue, (white,) about nine pounds; water, about ten gallons. These ingredients are to be thoroughly mixed and boiled and agitated.

In using the above-named composition the walls or ceilings should be thoroughly dusted and cleaned of any matter sticking to them by a brush or any other suitable means. The composition is slightly heated when it is to be used, so as to liquefy it, as it will assume a pasty condition. When it is to be used, it should be in a fluid state and of such consistency that it can be applied with a brush. When applied, it will prevent the cracking or peeling off when calcimining or whitewashing. It will prevent bugs or insects from injuring wall-paper of any kind, as it acts as a disinfectant. It will cover the water-stains on ceilings or other parts of walls in houses caused by leaks in roofs, &c. It will also obliterate any other objectionable stains or spots. When walls are to be painted, by the application of this composition it will tend to cause the paint to adhere better, and it also prevents flies from alighting on the walls. This composition forms a permanent coating on the walls.

I am aware that it is common to mix glue with soap or alum, broadly, and disclaim such; but,

Having thus described my invention, what I claim, and desire to secure by Letters Patent, is—

The composition herein described, consisting of about nine pounds of alum, about three and one-half pounds soap, about nine pounds white glue, and ten gallons of water, mixed and boiled as specified.

In testimony whereof I affix my signature in presence of two witnesses.

WILLIAM KAHLERT.

Witnesses:
  E. B. CAMPTEN,
  JESSE E. BELT.